United States Patent [19]
Shih

[11] Patent Number: 5,709,825
[45] Date of Patent: Jan. 20, 1998

[54] METHOD OF DETERMINING A THERMOFORMING PROCESS WINDOW OF A THERMOPLASTIC MATERIAL

[75] Inventor: Wayne Ken Shih, Kingsport, Tenn.

[73] Assignee: Eastman Chemical Company, Kingsport, Tenn.

[21] Appl. No.: 636,747

[22] Filed: Apr. 19, 1996

[51] Int. Cl.$^6$ ................................................ B29C 51/00
[52] U.S. Cl. .................... 264/40.1; 264/40.3; 264/40.6; 264/553; 425/140
[58] Field of Search ....................... 264/40.3, 40.6, 264/553, 554, 40.1; 425/140, 143

[56] References Cited

U.S. PATENT DOCUMENTS

| | | | |
|---|---|---|---|
| 4,489,034 | 12/1984 | Davison | 264/331.15 |
| 5,229,456 | 7/1993 | Ilenda et al. | 525/66 |
| 5,247,024 | 9/1993 | Natoli et al. | 525/298 |
| 5,310,810 | 5/1994 | Natoli et al. | 525/298 |
| 5,319,031 | 6/1994 | Hamilton et al. | 525/301 |
| 5,374,686 | 12/1994 | Clikeman | 525/298 |
| 5,506,307 | 4/1996 | Memon | 525/227 |
| 5,571,864 | 11/1996 | Bates et al. | 525/88 |

OTHER PUBLICATIONS

Thermoforming: A Plastic Processing Guide, G. Gruewald, Technomic Publishing Co., pp. 121–123, 1987.
Roark, Raymond J., *Roark's Formulas for Stress and Strain*, McGraw-Hill, p. 480 (1989).
McConnell, William K., "Thermoforming Technology", SPE's Industrial Thermoforming Symposium & Workshop, p. 3–2 (1994).

*Primary Examiner*—Jan H. Silbaugh
*Assistant Examiner*—Mark Eashoo
*Attorney, Agent, or Firm*—Cheryl J. Tubach; Harry J. Gwinnell

[57] ABSTRACT

A thermoforming process window of a rectangular sheet of a thermoplastic material is determined by calculating its Sag Number during heating. The Sag Number is a function of the sheets length, width and apex depth at the center of sag. Upon the Sag Number being between 10 and 40, preferably 15 and 35, and more preferably 19 and 28, the sheet is ready for forming into an end product.

8 Claims, 8 Drawing Sheets

METHOD OF DETERMINING A THERMOFORMING PROCESS WINDOW OF A THERMOPLASTIC MATERIAL

TECHNICAL FIELD

This invention relates to thermoforming thermoplastic materials and more particularly to a simple method of determining a thermoforming window for any thermoplastic material.

BACKGROUND OF THE INVENTION

Thermoforming is a common method of converting sheets of thermoplastic material into usable articles such as signs, displays, blister packaging, food and consumer packaging and medical device packaging. Thermoforming whether conducted on a large or small scale basis involves trial and error to determine when a sheet has reached the appropriate temperature for thermoforming.

In a typical cut-sheet operation the thermoplastic sheet, which has been sized to larger than the article to be made therefrom, is clamped on its sides. Typically, all four sides are clamped if the sheet is rectangular. In a continuous-sheet operation the thermoplastic sheet is clamped on its two longer sides. The clamped sheet is then heated for a period of time to a temperature such that the sheet becomes pliable and ready for forming. During forming, the sheet is conformed to a mold surface and vacuum is activated to complete the process. Additional aids such as plug assist or pressure may be required to form articles especially if they have many contours or are deep.

In the cut-sheet operation, the sheet is poked during heating to test the pliability of the sheet. If the sheet appears sufficiently pliable, then the lower temperature limit for thermoforming has likely been reached. Obviously, this poking technique is inherently inefficient because it requires practice and experience and has a substantial amount of error.

Another problem is in determining when the sheet has reached the upper temperature limit for thermoforming. If the upper temperature limit has been exceeded then excessive sag occurs which makes thermoforming more difficult. Excessive sag also creates too much surface area so that webbing occur during forming of a part. Webbing is the overlapping of excess thermoplastic material. The softened polymer may also fall onto or catch the bottom heater and cause fire. Visual inspections of the formed part are typically used to look for the occurrences of haze, bubbles, webbing and extra thining. This is also a subjective determination, which is often after the fact, leading to increased error.

Unfortuneately, for cut-sheet operations such as a sign shop the above determinations for lower and upper temperature limits are the only means available to determine if the thermoplastic material is ready to mold. For continuous-sheet operations trial and error is required to determine the thermoforming window and must be adjusted for environmental and seasonal changes. Obviously, when error occurs materials and time are wasted.

Thus, there exists a need in the art for a simple, accurate and no fault method to determine when a sheet of thermoplastic material is ready for thermoforming. Accordingly, it is to the provision of such that the present invention is primarily directed.

SUMMARY OF THE INVENTION

A thermoforming window of a rectangular sheet of a thermoplastic material is determined by the following method. The sheet is measured for its length and width. The sheet is clamped at each of its four sides and then heated. While observing the sheet sag from exposure of heat, its apex depth at the center of the sag is measured. A Sag Number is periodically determined by the formula:

$$S = 100 * h/d$$

wherein S is the Sag Number, h is the apex depth at the center of the sag and d is the characteristic length determined by the formula:

$$d = (l+w)/2$$

wherein l is the length of the sheet and w is the width of the sheet. Upon S being between 10 and 40, the sheet is formed into an end product. For methods wherein the sheet is clamped at two of its opposing sides rather than its four sides, the Sag Number is determined by the formula:

$$S = 100 * h/w.$$

DESCRIPTION OF THE INVENTION

This invention discloses a simple control concept to thermoform a sheet of thermoplastic material into a useful article. A thermoforming window is determined simply by utilizing a dimensionless ratio defined as the Sag Number, S. The upper limit of the thermoforming window occurs when the Sag Number is equal to about 40. The lower limit occurs when the Sag Number is equal to about 10. Preferably the thermoforming window occurs when the Sag Number is between 15 and 35, more preferably between 19 and 28. When the Sag Number is at the low end between 10 and about 18, plug assists and/or additional pressure during vacuuming may be requried to form a sheet into an article. A sheet with the Sag number at the high end is typically used only for special applications such as complicated shapes and embossing since the sheet is extremely pliable and requires special care in handling. The optimum condition for thermoforming in a simple vacuum operation exists when the Sag Number is equal to about 21.

The Sag Number of a rectangular sheet, clamped at four sides, can be defined if the characteristic length of the sheet is known. The characteristic length, d, for a rectangular sheet clamped at four sides is defined as $$d=(l+w)/2 \quad (1)$$

wherein l is the length of the sheet and w is the width of the sheet. The dimensionless Sag Number, S, is defined as $$S=100*h/d \quad (2)$$

wherein h is the apex depth at the center of sag. Sag occurs when the thermoplastic sheet droops from its weight when clamped in a frame and heated in an oven. Sag and h will be used herein interchangeably.

For application in which the sheet is clamped on two sides only, S is defined as the ratio of the apex sag depth, h, over the distance, w, between clamps:

$$S=h/w. \quad (3)$$

The formula is different because more sagging occurs for a sheet clamped at two ends rather than four sides. This determination is used for continuous-sheet operations.

Figure 1:
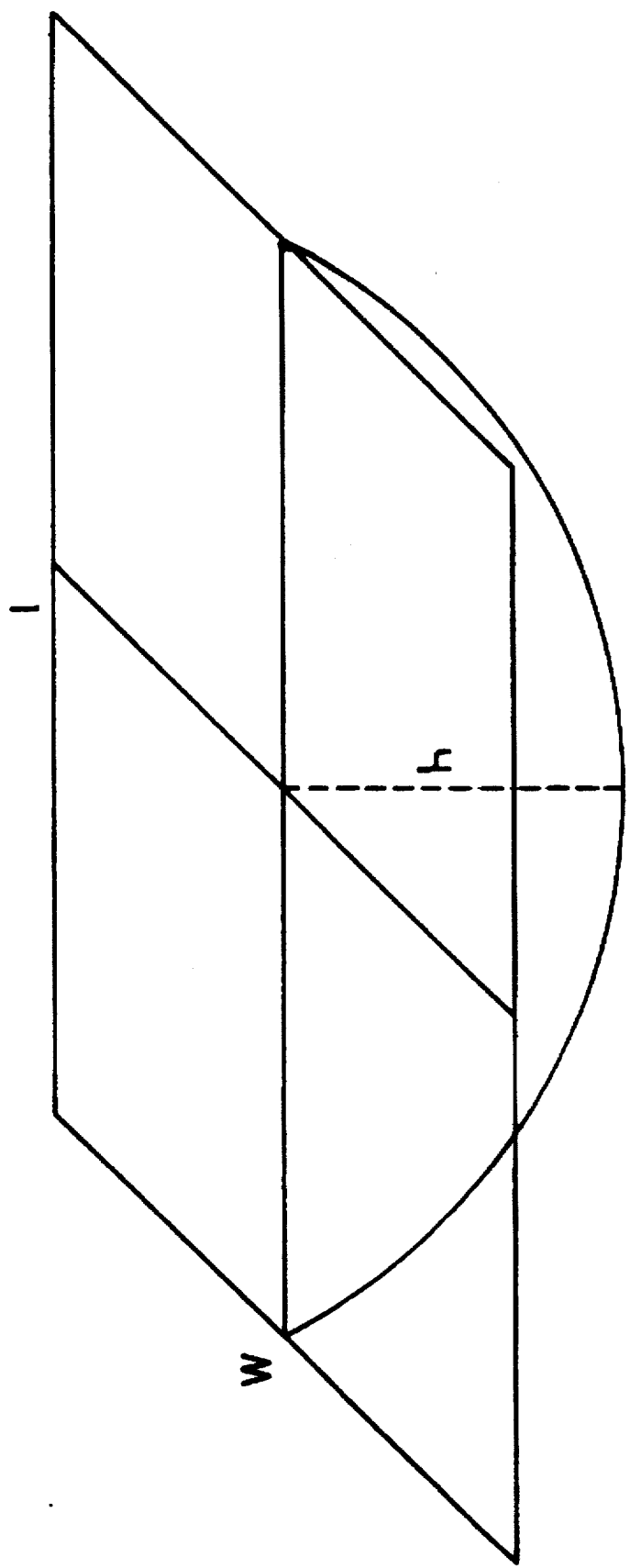
FIG. 1 is a perspective view of a sheet of thermoplastic material showing the dimensions required to determine a Sag Number utilized in the present invention.

FIG. 1 illustrates the variables l, w and h. As readily seen from FIG. 1 the variables l and w are easily measured prior to heating and clamping the sheet. The variable h is measured manually with a ruler during heating. If within the range of 10 to 40, the sheet is transferred to the forming unit for making the article. This is sufficient for a low output rate facility.

For larger operations, a microprocessor may be utilized to provide closed-loop feedback control of the sheet sag. The microprocessor is connected to an electronic eye which is installed to measure h. The only variables which have to be entered into the microprocessor are the length and width of the sheet. The microprocessor calculates and displays the Sag Number based on the theory developed in the present invention. When the Sag Number displayed is between 10 and 40 or a preset number is reached, heating is complete and the sheet is ready for forming. Use of the microprocessor and electronic eye substantially eliminates the heating variation caused by the on-off cycles of the heater and the fluctuations of environmental conditions such as fan, air conditioning, seasonal changes and weather that occur in manual calculations.

Thermoplastics, including engineering plastics and elastomers, are readily thermoformed utilizing the present invention. Some examples include polyesters, acrylics, polycarbonates, poly(vinyl chloride), polystyrene, acrylonitrile-butadiene-styrene copolymer, polyolefins, cellulosics, nylons, polyurethanes, polysulfones, polyarylates, acrylonitriles, acetals, fluoropolymers, polyetheretherketones and the like. Heavy gauge sheets (HGS) or thin gauge sheets (TGS) and male or female molds may be used with the present invention.

EXAMPLES

EXAMPLE 1

Measuring Sag Numbers

Sag Numbers were determined for the following three samples of thermoplastic materials using the vacuum mold process:

1) Spectar®, which is a 1,4-cyclohexanedimethanol modified polyethylene terephthalate (PETG) available from Eastman Chemical Company of Kingsport, Tennessee;
2) Plexiglas®, which is a polymethyl methacrylate (PMMA) available from AtoHaas of Philadelphia, Pa.; and
3) Lexan®, which is a polycarbonate (PC) available from General Electric of Mt. Vernon, Ind.;

Thermoplastic sheets of each material were cut into pieces each having a thickness of 0.118 inches, a length of 32 inches and a width of 22 inches. Each sheet was clamped on all four sides and placed in an oven at 425° F. The temperature of the sheets were measured by infared pyrometer. At various sheet temperatures the corresponding h was measured and the corresponding Sag Number was calculated using Equation (2) above. Only the results for sheets which formed acceptable articles using a vacuum forming technique are set forth below in Table A.

TABLE A

| Spectar® | | | Plexiglas® | | | Lexan® | | |
|---|---|---|---|---|---|---|---|---|
| T, °F. | h, in | S | T, °F. | h, in | S | T, °F. | h, in | S |
| 300 | 5.00 | 19 | 340 | 5.00 | 19 | 360 | 4.75 | 18 |
| 310 | 5.75 | 21 | 350 | 5.50 | 20 | 370 | 5.50 | 20 |
| 320 | 6.25 | 24 | 360 | 6.25 | 24 | 380 | 6.00 | 22 |
| 330 | 7.50 | 28 | 366 | 7.50 | 28 | | | |

Figure 2:
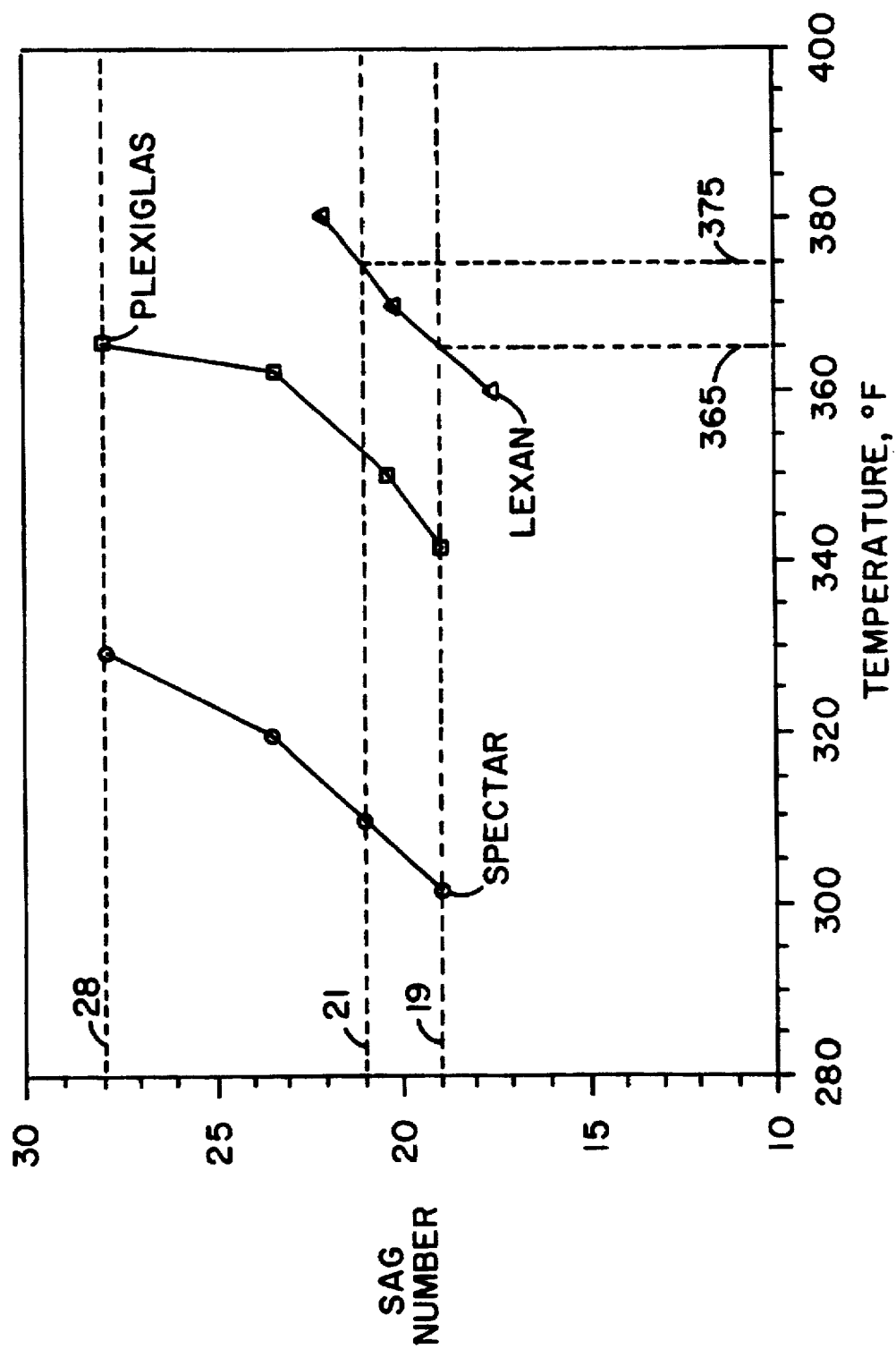
FIG. 2 is a graph demonstrating the relationship between Sag Number and temperature.

The results are demonstrated in FIG. 2 by a graph of Sag Number versus temperature.

EXAMPLES 2-4

Verification

To verify the accuracy of using the Sag Number to determine if a sheet was ready for thermoforming, a thermoforming window for the vacuum mold process was determined for each material based on the findings in Examples 2-4 for formability to establish the lower limit, visual observations to establish the upper limit and thickness versus temperature profile to establish the optimum temperature. The resulting thermoforming windows are set forth in Table B below. Each window was narrower as compared to the literature data in parentheses, which was available from McConnell, William K., paper entitled *Thermoforming Technology*, SPE's Industrial Thermoforming Symposium & Workshop (1994), pg. 3-2. The narrower range was due to the much higher lower limit identified by unity formability.

TABLE B

| | Forming Range, °F. | Optimum Temp, °F. |
|---|---|---|
| Spectar® PETG | 300-330 (250-330) | 310 (300) |
| Plexiglas® PMMA | 340-365 (290-360) | 353 (350) |
| Lexan® PC | 365-400 (335-400) | 375 (375) |

The thermoforming window temperatures determined in Examples 2-4 correlate with the Sag Numbers determined in Example 1 as shown in FIG. 2. The lower temperature limit and optimum temperature occur when the Sag Numbers are about 19 and 21, respectively, for Spectar® and Plexiglas®. Such is also the case for Lexan® with the lower temperature limit and optimum temperature of 365° and 375° F., respectively, determined by interpolation. The upper temperature limits for Spectar® and Plexiglas® occur when the Sag Number is about 28. Based on the literature, the upper limit temperature for Lexan® could result in a Sag Number of 28.

EXAMPLE 2

Lower Temperature Limit/Formability

Formability, F, was used to establish the lower limit of the thermoforming window. Formability is defined as the ratio of the real volume of a thermoformed article to its maximum theoretical volume:

$$F = V/V_o \qquad (4)$$

wherein V is the real volume of the thermoformed part and $V_o$ is the theoretical volume based the dimensions of the mold cavities.

Formability is always equal to or less than one. At F less than one, the sheet is too cold to thermoform. When F initially equals one, the sheet has reached its lower temperature limit for thermoforming. F remains unity thereafter.

Figure 3:
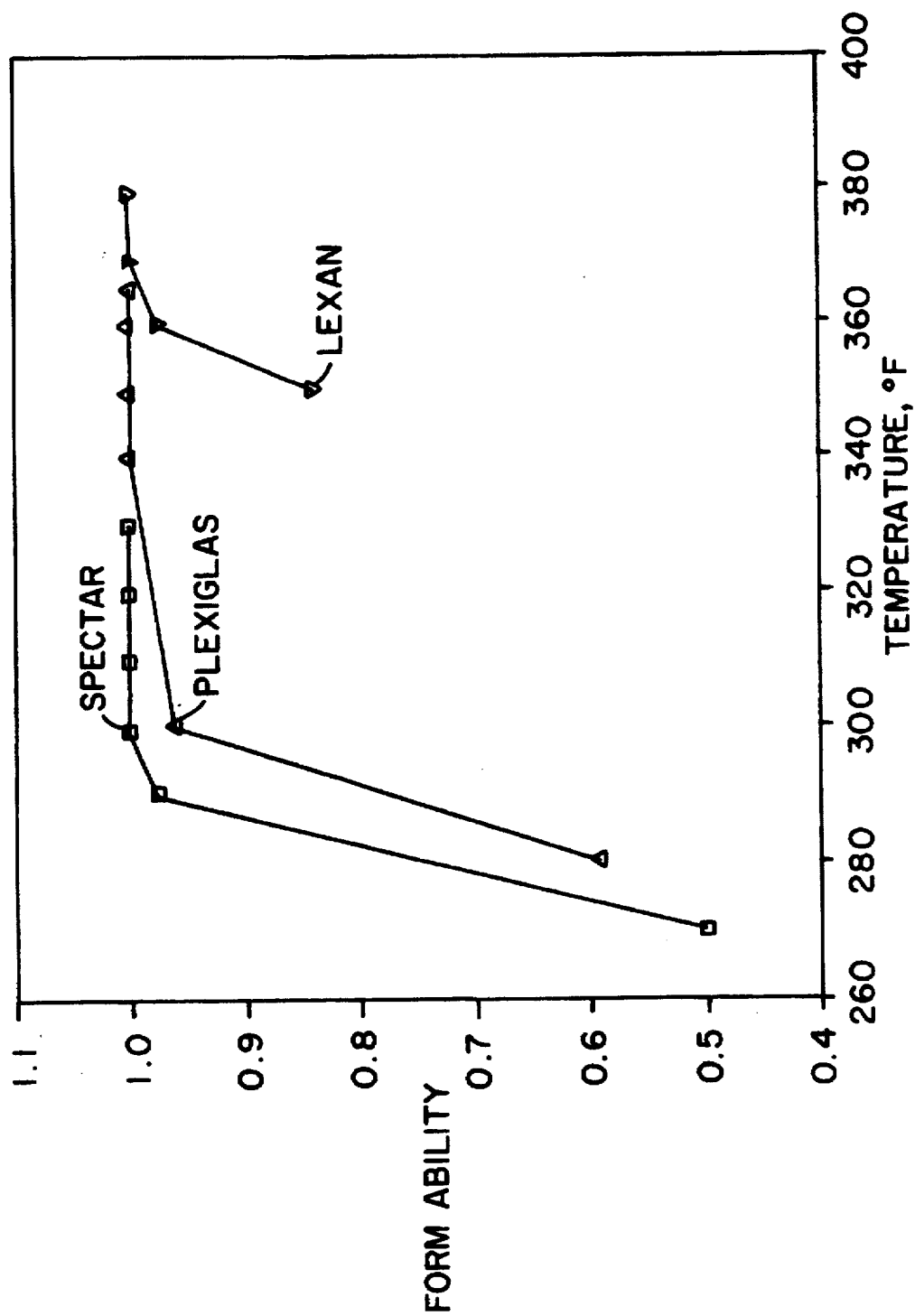
FIG. 3 is a graph demonstrating the relationship between formablity and temperature.

The temperatures of Spectar®, Plexiglas®, and Lexan® at which each started to lose resolution with their corresponding value of formability is shown in FIG. 3. With formability equal to one, Spectar® and Plexiglas® were identified to have lower temperature limits of 300° F. and 340° F., respectively. The lower temperature limit for Lexan® was determined to be somewhat below 370° F. since the resolution at 370° F. was very good and the formability at 360° F. was not.

EXAMPLE 3

Upper Temperature Limit/Visual Inspection

While formability can determine the lower forming temperature limit, it cannot determine the upper limit since formability is always equals to one when the sheet temperature is above the lower temperature limit. The upper temperature limit was determined by visually inspecting the formed part for imperfections such as webbing, haze, bubbles, thinning, and degradation. Table C illustrates these visual observation.

TABLE C

|  | Spectar® | Plexiglas® | Lexan® |
|---|---|---|---|
| Visual Imperfection | Webbing @ 330° F. | Bubbles and Webbing @ 366° F. | Bubbles @ 380° F. |

The upper limit of Spectar® was about 330° F., the point at which webbing started to develop. In addition to webbing, Plexiglas® also had undesirable bubbles caused by the depolymerization of PMMA or moisture effect. Therefore, the upper limit of Plexiglas® was chosen at 365° F. For Lexan®, the bubbles were expected since the sheets were not dried before thermoforming. The true upper limit for Lexan® could not be determined due to sever bubble formation. Nonetheless, webbing was not seen for Lexan® at 380° F. which indicated that its upper limit would be over 380° F. if the sheet had been dried. A subsequent experiment was performed using a predried Lexan® sheet. The upper temperature limit was determined to be 400° F.

EXAMPLE 4

Optimum Temperature/Thickness v. Temperature

Figure 4:
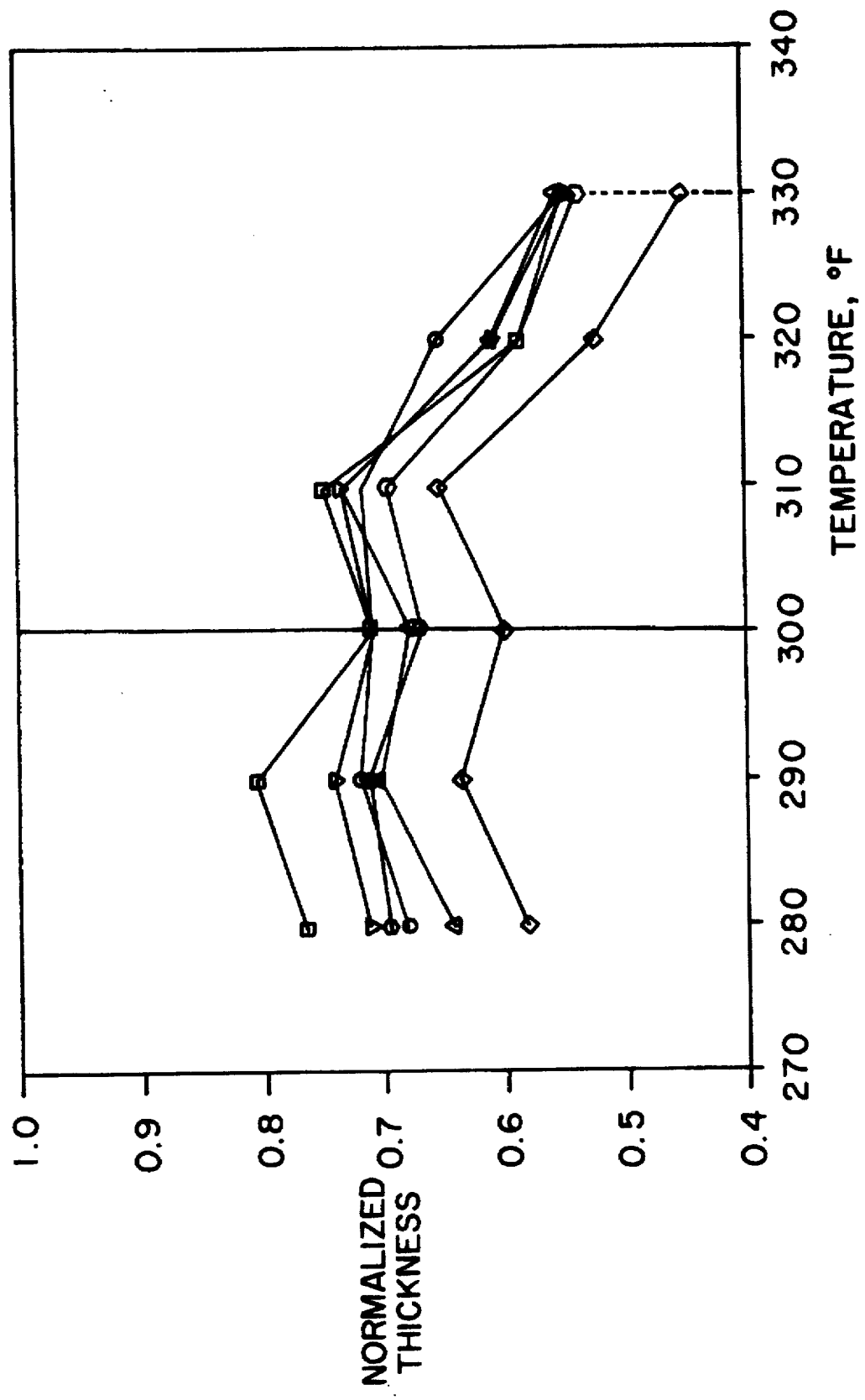
FIG. 4 is a graph demonstrating the relationship between thicknesses of formed articles of Spectar® and temperature.
Figure 5:
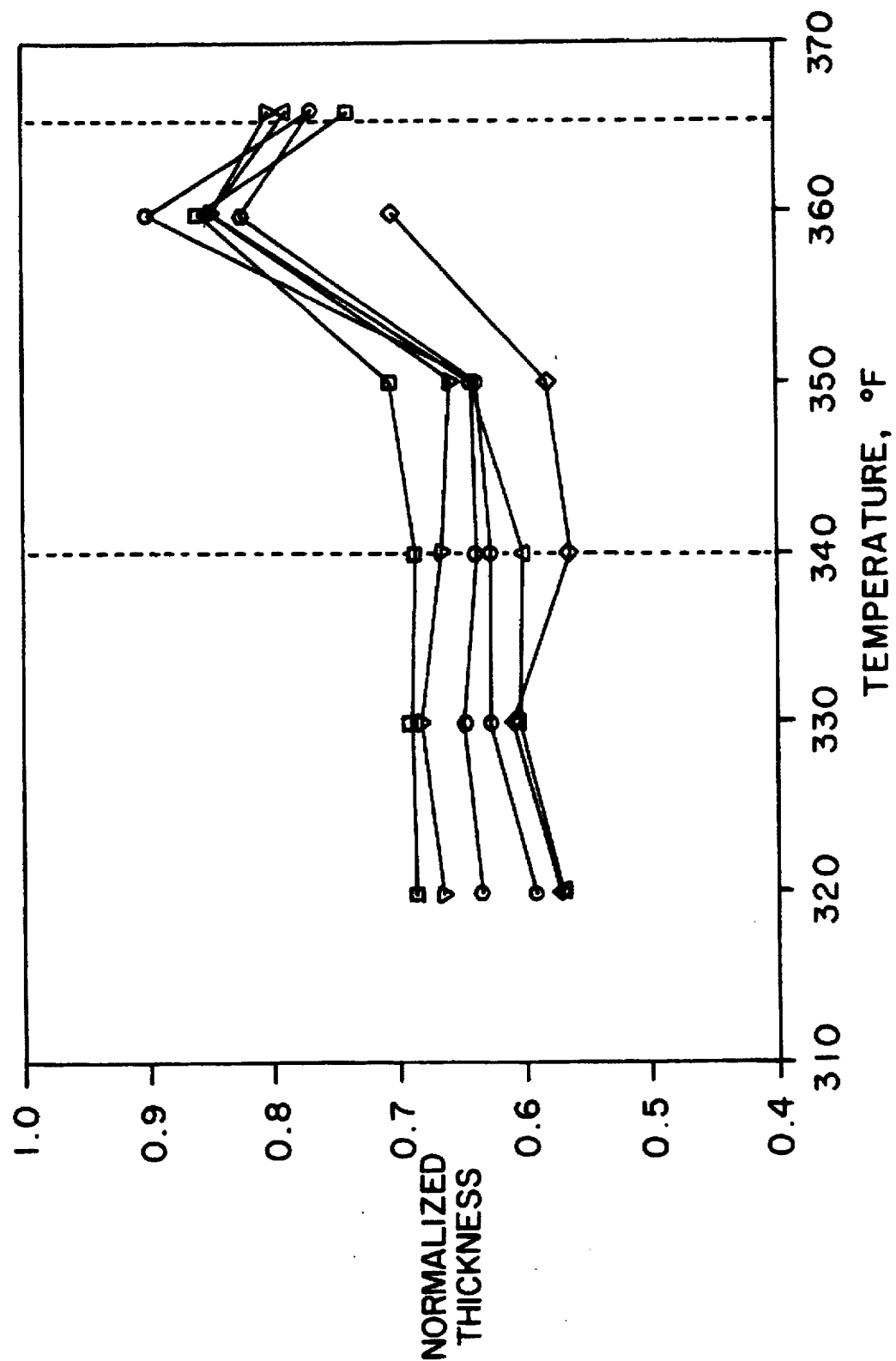
FIG. 5 is a graph demonstrating the relationship between thicknesses of formed articles of Plexiglas® and temperature.

Thicknesses of the formed articles at the bottom center of six cavities at different sheet temperatures were measured for the Spectar® and Plexiglas®. The thickness versus sheet temperature profiles are shown in FIGS. 4 and 5, respectively. For Spectar®, the thickness profile of each cavity demonstrated a hump between 300° F. and 330° F. with a peak at 310° F. The sheet temperature at 310° F. was determined to be the best or optimum temperature because it produced the thickest articles. The thickness profile below 300° F. was obtained from partially formed parts due to cold sheets. For Plexiglas®, the thickness profile had a hump between 340° F. and about 365° F. with a peak at 360° F.

EXAMPLE 5

Comparison of S to Young's Modulus

The Young's modulus at temperatures over the glass transition temperatures of the thermoplastic materials utilized in Examples 1–4 were not available. However, it was unexpectedly found that the Young's modulus could be predicted utilizing a quadratic function of sag, h, and that the correlation between Young's modulus and sag is universally applicable.

The literature, Roark, Raymond J., Roark's Formulas for Stress and Strain, McGraw-Hill (1989), provides data on the deflection of a horizontal plate with four sides fixed. The plate is flat, is uniform, has a maximum deflection of not more than about twice the thickness and is never stressed beyond its elastic limit. Table D below shows such data for plates with a length/width ratio equal to one, i.e. square, and greater than 1.5, i.e. rectangular. The values x and y are two dimensionless groups defined as:

$$y = qw^4/Et^4 = \rho g w^4/Et^3 \qquad (5)$$

$$x = h/t \qquad (6)$$

wherein h is the sag or deflection (m), q is the load due to the weight (N/m²), ρ is the density (kg/m³), w is the width of the sheet (m), E is the Young's modulus (N/m²) and t is the thickness (m).

TABLE D

| y | 0 | 12.5 | 25 | 50 | 75 | 100 | 125 | 150 | 175 | 200 | 250 |
|---|---|---|---|---|---|---|---|---|---|---|---|
| x l/w = 1 | 0 | .165 | .25 | .59 | .8 | .95 | 1.08 | 1.19 | 1.28 | 1.38 | 1.54 |
| x l/w > 1.5 | 0 | .28 | .51 | .825 | 1.07 | 1.24 | 1.4 | 1.5 | 1.63 | 1.72 | 1.86 |

Using a quadratic regression for the data shown in Table D, the relationship between y and x for a rectangular sheet with l/w>1.5 was determined to be $$y = 7.268 - 17.565x + 76.175x^2 \qquad (7)$$

Similarly, the second-order equation for a square sheet (l/w=1 in Table D) was determined to be $$y = 7.179 + 12.033x + 92.823x^2 \qquad (8)$$

Figure 6:
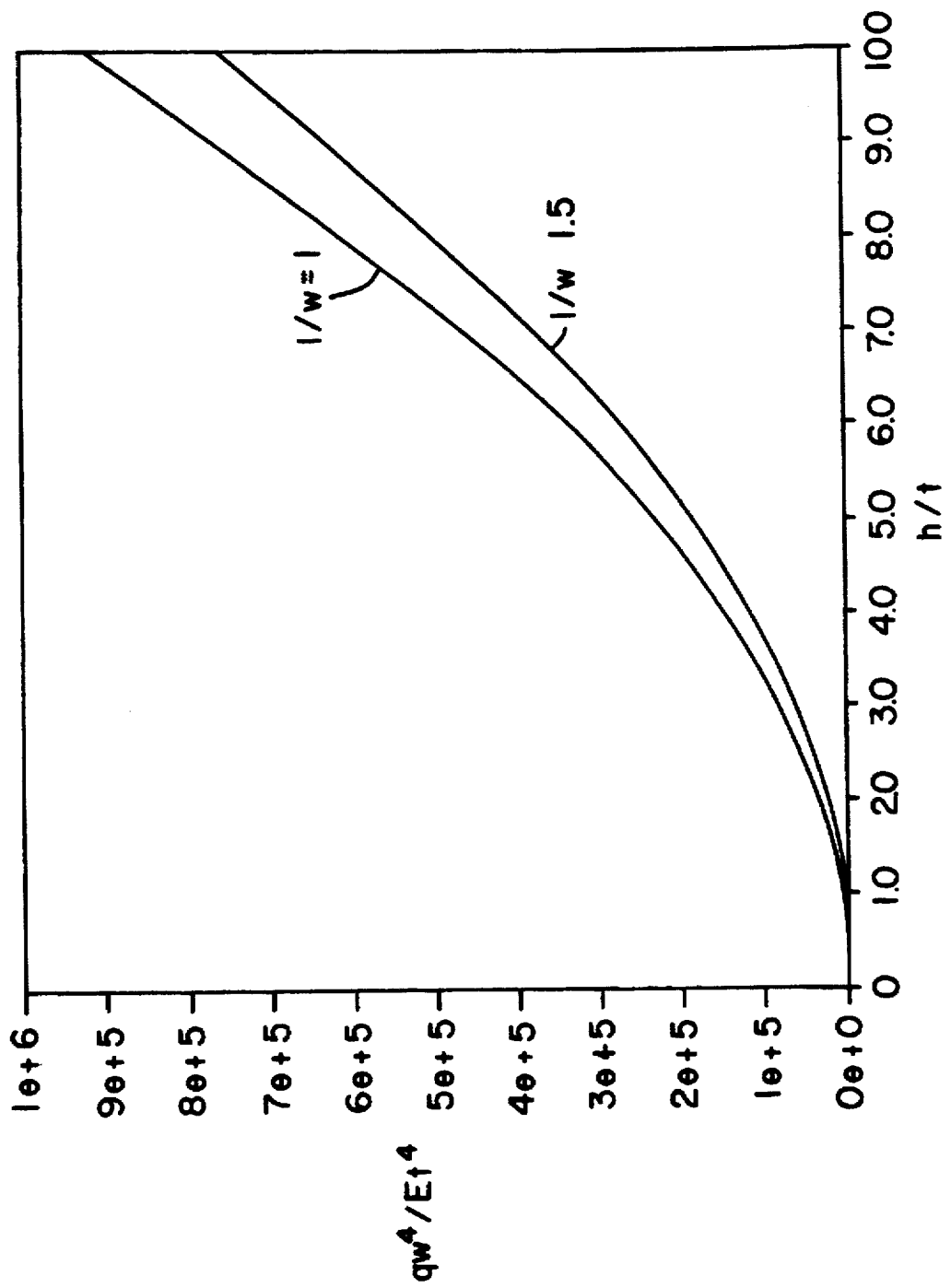
FIG. 6 is a graph demonstrating the relationships of Equations (7) and (8) between sag and Young's modulus.

FIG. 6 demonstrates the quadratic functions of Equations (7) and (8) graphically with the assumption that the nonlinear relationship holds for much larger values of x. If the sag can be determined experimentally by visual or electronic means as described above, it follows that the Young's modulus, E, of a polymer at elevated temperatures may be determined from Equations (7) and (8). This was done so for each of the materials in Example 1 and is shown graphically in FIG. 7.

The Young's modulus also follows Arrehnius' equation:

$$E = E_o \exp(E_a/RT) \quad (9)$$

or $$\ln E = A + E_a/RT \quad (10)$$

where A is the natural log of the frequency factor, $E_o$.

$E_a$ is the activation energy, J/mol.

R is the gas constant, 8.31 J/mol° K.

T is the absolute temperature, °K.

Figure 7:
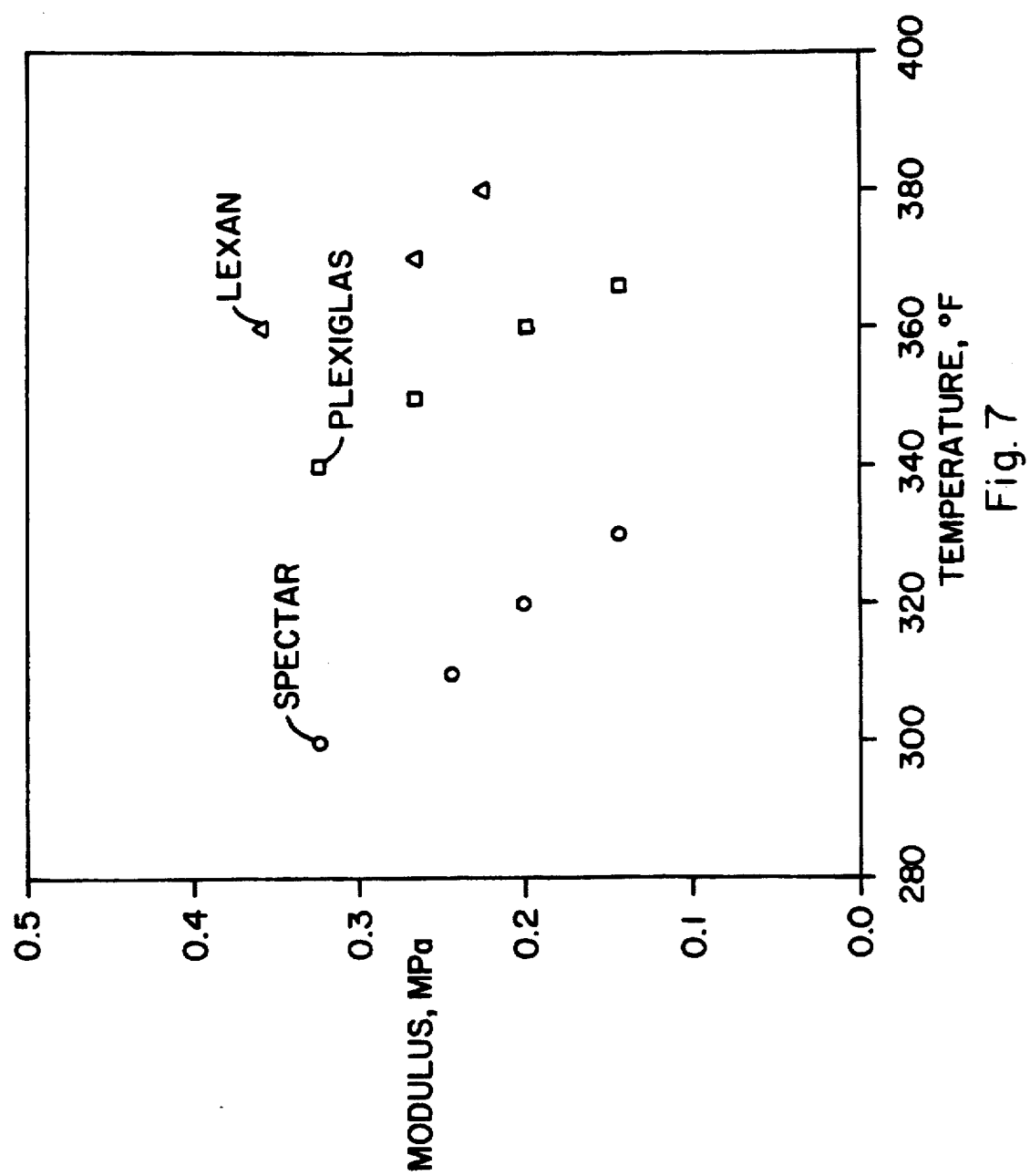
FIG. 7 is a graph demonstrating the relationship between temperature and Young's modulus as a result of data from Examples 2–4.

The nonlinear regressions of data from FIG. 7 resulted in the coefficients for Young's modulus for Arrehnius' equation as tabulated in Table E.

TABLE E

|  | A | $E_a/R$, °K. |
|---|---|---|
| Spectar ® | −8.188 | 8813.284 |
| Plexiglas ® | −12.387 | 11163.925 |
| Lexan ® | −6.798 | 8910.243 |

Figure 8:
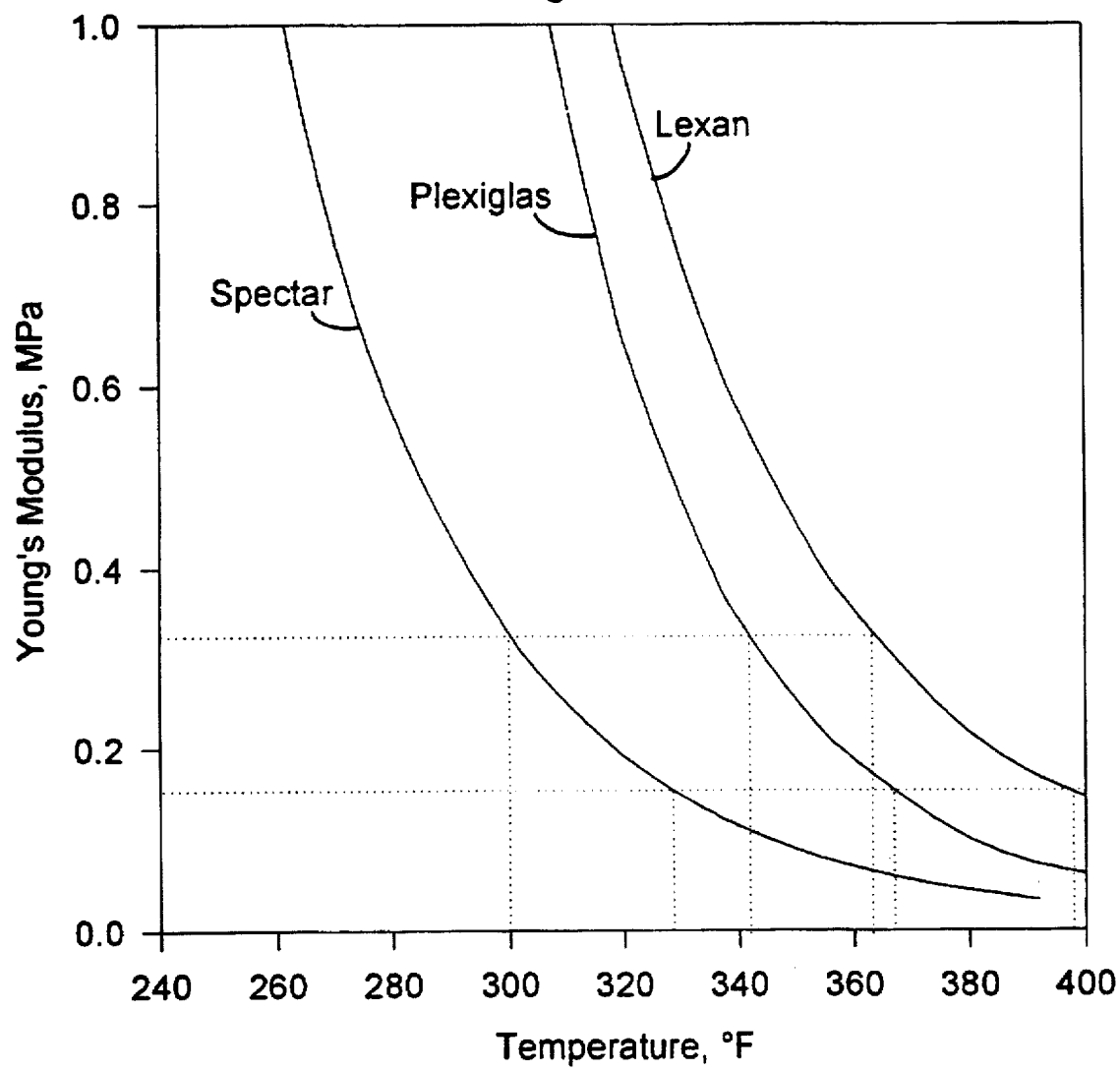
FIG. 8 is a graph demonstrating the relationship between temperature and Young's modulus using the nonlinear regression data of Examples 2–4 as applied to Arrehnius' equation.

FIG. 8 was constructed from the data of Table E.

By using the thermoforming window of Spectar®, 300°–330° F., the corresponding Young's modulus range constructed in FIG. 8 was established to be from 0.15 to 0.32 MPa. Surprisingly, the thermoforming windows of other two materials were established by finding the corresponding temperatures to the modulus range of Spectar®. Table F shows the results of FIG. 8 as compared to Table B.

TABLE F

| Forming Range | from Table B | from FIG. 8 |
|---|---|---|
| Spectar ® | 300–330° F. | 300–330° F. |
| Plexiglas ® | 340–365 | 342–367 |
| Lexan ® | 365–400 | 364–398 |

This comparision clearly demonstrated that thermoforming windows were directly dependent on Young's moduli at elevated temperatures for different materials. Different temperature windows for different materials are required in order to embrace the same Young's modulus range.

The invention has been described in detail with particular reference to preferred methods thereof, but it will be understood that variations and modifications can be effected within the spirit and scope of the invention.

What is claimed is:

1. A method for thermoforming a rectangular sheet of a thermoplastic material having a length, a width, and a thickness including determining a thermoforming process window comprising the steps of:

a) measuring a length and a width of a rectangular sheet of a thermoplastic material, b) clamping the sheet at each of four sides of the sheet, c) heating the sheet to a temperature at which the sheet sags from exposure to heat, d) periodically measuring an apex depth at a center of sag, e) periodically determining a Sag Number by:

$$S = 100 * h/d$$

wherein S is the Sag Number, h is the apex depth measured at the center of sag and d is a characteristic length determined by:

$$d = (l+w)/2$$

wherein l is the length as measured of said sheet and w is the width as measured of the sheet, and f) upon the Sag Number being between 10 and 40, thermoforming the sheet into an end product.

2. The method of claim 1 wherein the sheet is thermoformed under vacuum with additional pressure, plug assist or a combination thereof when the Sag Number is between 10 and about 18.

3. The method of claim 1 wherein the sheet is thermoformed when the Sag Number is between 15 and 35.

4. The method of claim 3 wherein the sheet is thermoformed under vacuum when the Sag Number is between 19 and 28.

5. The method of claim 4 wherein the sheet is thermoformed when the Sag Number is equal to about 21.

6. The method of claim 1 wherein the thermoplastic material is selected from the group comprising polyesters, acrylics, polycarbonates, poly(vinyl chloride), polystyrene, acrylonitrile-butadiene-styrene copolymer, polyolefins, cellulosics, nylons, polyurethanes, polysulfones, polyarylates, acrylonitriles, acetals, fluoropolymers, and polyetheretherketones.

7. A method for thermoferming a rectangular sheet of a thermoplastic material having a length, a width, and a thickness including determining a thermoforming process window comprising the steps of:

a) clamping the sheet at two opposing sides of the sheet, b) measuring a distance between the clamped opposing sides of the sheet, c) heating the sheet to a temperature at which the sheet sags from exposure to heat, d) periodically measuring an apex depth at a center of sag, e) periodically determining a Sag Number by:

$$S = 100 * h/w$$

wherein S is the Sag Number, h is the apex depth measured at the center of sag and w is the distance as measured between the opposing sides of the sheet, and f) upon the Sag Number being between 10 and 40, thermoforming the sheet into an end product.

8. The method of claim 7 wherein the thermoplastic material is selected from the group comprising polyesters, acrylics, polycarbonates, poly(vinyl chloride), polystyrene, acrylonitrile-butadiene-styrene copolymer, polyolefins, cellulosics, nylons, polyurethanes, polysulfones, polyarylates, acrylonitriles, acetals, fluoropolymers, and polyetheretherketones.

* * * * *